Nov. 5, 1929.                H. FEIT                1,734,422
                              POCKET
        Original Filed Feb. 10, 1927    2 Sheets-Sheet 2

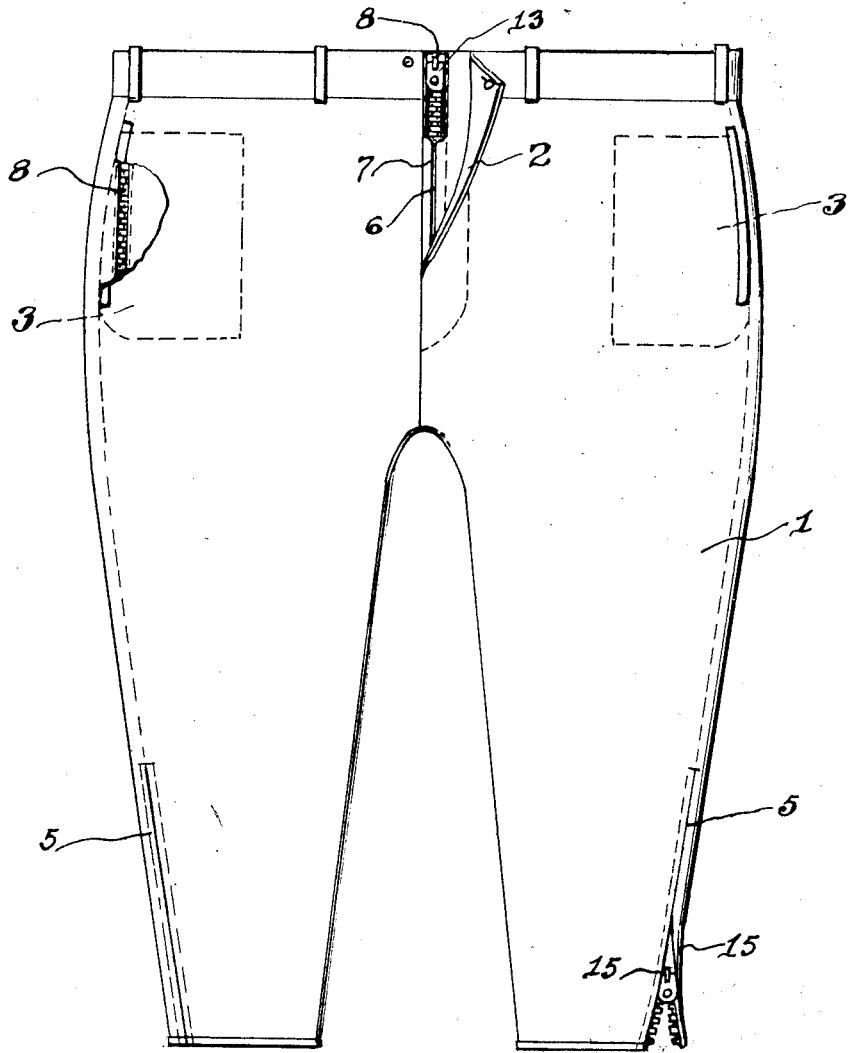
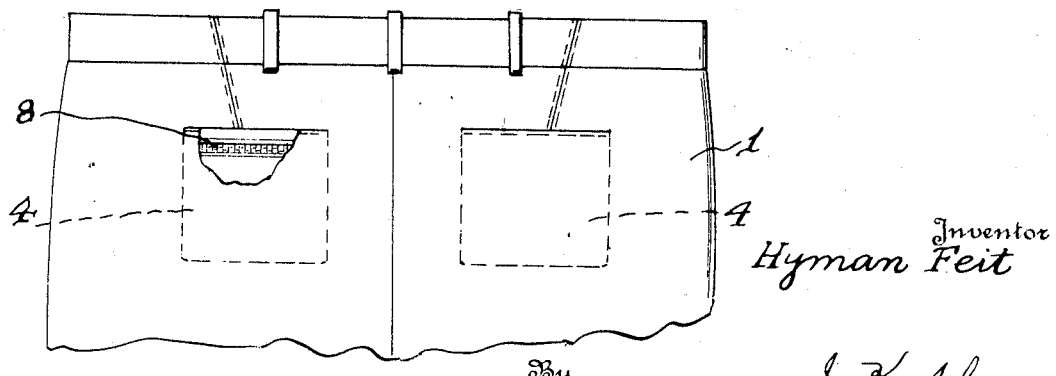

Inventor
Hyman Feit

By              J. Kaplan
                   Attorney

Patented Nov. 5, 1929

1,734,422

UNITED STATES PATENT OFFICE

HYMAN FEIT, OF BROOKLYN, NEW YORK, ASSIGNOR TO ABRAHAM FEIT, OF NEW YORK, N. Y.

POCKET

Application filed February 10, 1927, Serial No. 167,282. Renewed August 12, 1929.

This invention relates to trousers, knickers, breeches and the like and more particularly to the closure means of such garments.

The object of the invention is to provide safety pockets adjacent the usual pockets with means to securely close said safety pockets without the aid of buttons.

Other objects will appear as the disclosure progresses. The drawings are intended to indicate a possible embodiment of the invention.

It is obvious that the actual needs of manufacture may necessitate certain mechanical changes. It is therefore intended not to limit the invention to the embodiment indicated but rather to define such limits in the appended claim. For a more detailed understanding of the invention, attention is now called to the drawings in which a preferred embodiment is shown illustrated.

Figure 1 is a front view of a pair of knickers showing the novel closure means attached thereto.

Fig. 2 is a fragmentary rear view thereof.

Fig. 3 is an enlarged view of a detail of the pocket.

Fig. 4 is a section on line 4—4 of Fig. 3.

Fig. 5 is a detail of the closure member.

Referring to the drawings in detail in which like reference characters denote like parts throughout the specification, numeral 1 represents a pair of knickers, 2 the fly covering, 3 the side pockets and 4 the rear pockets. At the bottom of each leg portion are side openings 5. Underneath the fly covering 2, is the slit 6 which may be opened or closed to readily put the knickers on or off. As noted in Fig. 1 the edges 7 of the slit contact with each other in order to hide the closure means 8, fastened in back of the slit. The closure means consist of separable fasteners which may be substantially of the type shown in Patent No. 1,219,881, dated March 20, 1917. The separate interengaging members 9 and 10 of said fasteners are secured respectively to tapes or webbings 11 and 12 and stitched adjacent the edges of the slit 6. The fasteners are opened and closed by moving the slide 13 by means of rings or handles 14, in the known manner, causing the multiple parts to separate or interlock.

As noted in Fig. 1, the side openings 5 at the bottom of the leg portions are provided with similar closure members 8 and are hidden from view by the meeting edges 15. To slip on the garment the ring or handle 14 is pulled upward, thus disengaging the closure members and allowing the meeting edges 15 to be spread apart. For closing the openings the handle 14 is pulled downward and thereby engaging the complementary closure members.

Figs. 2, 3 and 4 show the novel closure members applied to safety pockets, that is to a pocket within a pocket. Numeral 16 represents the pocket member having wall members 17, 18 and 19, all of said wall members being stitched together at three sides forming the pocket 20 and the safety pocket 21. The wall member 17 is made of two sections. The section opposite the interengaging elements 8 runs parallel with and overlies the said closure member. The reason for this being that at this point there will be a certain amount of friction between the interengaging element and the section of the wall member. In order to add life to the garment and prevent any wear and tear the said section can be made of such material so as to act as a protective shield. As noted in Fig. 4 for access to the pocket 20, an opening 22 is provided and for access to the safety pocket 21 an opening 23 is provided in the middle wall member 18. To the sides of the opening 23 are attached the closure members 8 heretofore described and which operate in the usual manner.

It will thus be seen that the complementary safety pocket will provide a safe place to carry valuables without fear of losing them as the opening of said pocket is hidden from view and can be securely kept closed by means of the closure members.

Having described my invention what I desire to secure by United States Letters Patent is:

The combination with the wall of a garment having a slitted opening therein, an adjacent edge of the opening having an overlapping turned in edge to which is stitched a wall member, an intermediate wall member stitched to the first mentioned wall member, said intermediate wall member made of two parts leaving a gap between them, the adjacent edges of the intermediate wall member being turned in, a series of inter-engaging fastening members sewed to the said turned in edges, the space between the first mentioned wall member and the second mentioned intermediate wall member forming a main pocket, another wall member adjacent the said intermediate wall member, the space between the said intermediate wall member and the last mentioned wall member forming a safety pocket, the first mentioned wall member made of two sections, the section opposite the fastening members running parallel with and overlying the said interengaging elements.

In testimony whereof I affix my signature.

HYMAN FEIT.